United States Patent
Lee et al.

(10) Patent No.: US 11,412,086 B2
(45) Date of Patent: Aug. 9, 2022

(54) WORK PROCESS SUPPORTING SYSTEM BASED ON INTERACTIVE VOICE AND TEXT COMMUNICATION

(71) Applicant: MindwareWorks Co., Ltd., Seoul (KR)

(72) Inventors: Jae In Lee, Goyang-si (KR); Hyun Sun Cho, Seoul (KR)

(73) Assignee: MindwareWorks Co., Ltd., Seoul (KR)

( * ) Notice: Subject to any disclaimer, the term of this patent is extended or adjusted under 35 U.S.C. 154(b) by 0 days.

(21) Appl. No.: 17/258,742

(22) PCT Filed: Jun. 24, 2019

(86) PCT No.: PCT/KR2019/007571
§ 371 (c)(1),
(2) Date: Jan. 8, 2021

(87) PCT Pub. No.: WO2020/036304
PCT Pub. Date: Feb. 20, 2020

(65) Prior Publication Data
US 2021/0274041 A1    Sep. 2, 2021

(30) Foreign Application Priority Data

Aug. 17, 2018 (KR) .................. 10-2018-0095793

(51) Int. Cl.
*H04M 3/493* (2006.01)
*H04M 3/42* (2006.01)
(52) U.S. Cl.
CPC ....... *H04M 3/4938* (2013.01); *H04M 3/4217* (2013.01); *H04M 3/42382* (2013.01)

(58) Field of Classification Search
CPC ............. H04M 3/4938; H04M 3/4217; H04M 3/42382
See application file for complete search history.

(56) References Cited

U.S. PATENT DOCUMENTS

| | | | |
|---|---|---|---|
| 8,693,377 B1* | 4/2014 | Hazy ..................... | H04M 7/003 379/88.16 |
| 2001/0014861 A1 | 8/2001 | Oh | |
| 2002/0159475 A1 | 10/2002 | Hung et al. | |

FOREIGN PATENT DOCUMENTS

| | | |
|---|---|---|
| JP | 2002-016983 A | 1/2002 |
| KR | 10-2009-0084062 A | 8/2009 |

(Continued)

OTHER PUBLICATIONS

International Search Report for PCT/KR2019/007571 dated Oct. 1, 2019 from Korean Intellectual Property Office.

*Primary Examiner* — Suraj M Joshi
(74) *Attorney, Agent, or Firm* — Revolution IP, PLLC

(57) ABSTRACT

Disclosed is a work process supporting system based on interactive voice and text communication, and more particularly a work process supporting system based on interactive voice and text communication, in which at least one of a voice and a text is selectively applied according to congenital/acquired conditions of an information or service requester, so that a work process for providing information or service can be carried out, thereby freeing from constraints in input/output means for performing the work process for providing the information or the service and carrying out the work process while keeping continuity, reliability and accuracy.

2 Claims, 2 Drawing Sheets

(56) References Cited

FOREIGN PATENT DOCUMENTS

| KR | 10-1217762 | B1 | 1/2013 |
| KR | 10-1366671 | B1 | 3/2014 |

\* cited by examiner

WORK PROCESS SUPPORTING SYSTEM BASED ON INTERACTIVE VOICE AND TEXT COMMUNICATION

TECHNICAL FIELD

The disclosure relates to a work process supporting system based on interactive voice and text communication, and more particularly to a work process supporting system based on interactive voice and text communication, in which at least one of a voice and a text is selectively applied according to congenital/acquired conditions of an information or service requester, so that a work process for providing information or service can be carried out, thereby freeing from constraints in input/output means for performing the work process for providing the information or the service and carrying out the work process while keeping continuity, reliability and accuracy.

BACKGROUND ART

In general, a contact center system refers to a system built to make a customer, in other words, a person who asks for consultation transmit a demand through telephone consultation with a consultant, in other words, a person who handles the consultation and get various services corresponding to the demand, and has currently been used as a contact center system based on interactive voice response (IVR).

A contact center, which is an advanced concept of the existing call center that simply answers a customer call, communicates with a customer through various channels such as an E-mail, a facsimile, an instant message, etc. except a phone call, and typically includes a computer and telephony integration (CTI) server and an interactive voice response (IVR).

CTI refers to technology that shares information resources, in other words, data, a fax, voice information, etc. between different apparatuses by connecting a telephone and a computer. In this case, the CTI server serves to distribute a call to a private branch exchange (PBX) and a consultant.

An IVR-based contact center service system first guides details of information provided from the system to a customer, receives the specific identification (ID) of the customer, searches a host, in other words, a server for the corresponding information, and then converts a found result into a voice, thereby providing a corresponding service.

However, such an IVR-based contact center service system provides only a voice service and therefore complicates a guide service, thereby having problems that a customer feels inconvenience in using the guide service and thus has low satisfaction with the service Meanwhile, a service providing method based on a smartphone (an application of the smartphone) is usually given in such a manner that a user of the smartphone accesses a previously set communication server and a service is provided according to an automated service routine.

In other words, it is general that information requested by a user of the smartphone is obtainable within only the service automated in the server, and the service is not customized for the user of the smartphone, who requests the information, but unilaterally provided. Further, it is still a problem that only a consultation service with a voice is provided like the existing IVR-based consultation even when a request for connection with a consultant is made through the smartphone.

As the related art, there is Korean Patent No. 10-1217762 (published on Jan. 2, 2013, titled "INTERACTIVE CONSULTATION SYSTEM AND METHOD USING SMART PHONE").

Technical Problem

The disclosure is conceived to solve the foregoing problems of the related art, and an aspect of the disclosure is to provide a work process supporting system based on interactive voice and text communication, in which at least one of a voice and a text is selectively applied according to congenital/acquired conditions of an information or service requester, so that a work process for providing information or service can be carried out, thereby freeing from constraints in input/output means for performing the work process for providing the information or the service and carrying out the work process while keeping continuity, reliability and accuracy.

Further, an aspect of the disclosure is to provide a work process supporting system based on interactive voice and text communication, in which a dynamic page formed with only content of work related to information or service requested by an information or service requester or a dynamic page formed with only content of work reflecting situation information about the information or service requester is created and transmitted to the requester terminal, so that only the content of the work process needed for the information or service requester can be quickly and accurately provided, thereby reducing time, efforts and costs in the work process for providing the information or the service.

Further, an aspect of the disclosure is to provide a work process supporting system based on interactive voice and text communication, in which one of a voice communication channel and a text communication channel is selectively applied according to situations, conditions and surrounding environments of the information or service requester, and the channels are automatically switched over to each other according to the situations, conditions and surrounding environments of the information or service requester, thereby supporting the work process by immediately responding to change in the situations or the like of the information or service requester, and thus improving the satisfaction, continuity, reliability and accuracy of the work process.

Technical Solution

According to the disclosure, a work process supporting system based on interactive voice and text communication, which is proposed to solve the foregoing problems, includes: a requester terminal configured to allow an information or service requester to selectively use at least one of a voice and a text to request provision of information or service and receive the requested information or service; a provision proxy server configured to provide information or service to the information or service requester, whose identification has been completed, on behalf of an information or service provider; and a provider work-processing server configured to identify the information or service requester, who requests the provision of the information or service, and request the provision proxy server to do the provision of the information or service by proxy.

Here, the provision proxy server may create a dynamic page formed with only content of a work process, which is extracted in relation to information or service requested by the information or service requester using the voice or the text, and transmit the dynamic page to the requester terminal.

Further, the provision proxy server may create a dynamic page formed with only content of a work process, which is extracted reflecting situation information about the information or service requester whose identification has been completed by the provider work-processing server, and transmit the dynamic page to the requester terminal.

Advantageous Effects

With the foregoing work process supporting system based on interactive voice and text communication according to embodiments of the disclosure, at least one of a voice and a text is selectively applied according to congenital/acquired conditions of an information or service requester, so that a work process for providing information or service can be carried out, thereby having advantages of freeing from constraints in input/output means for performing the work process for providing the information or the service and carrying out the work process while keeping continuity, reliability and accuracy.

BEST MODE

Figure 1:
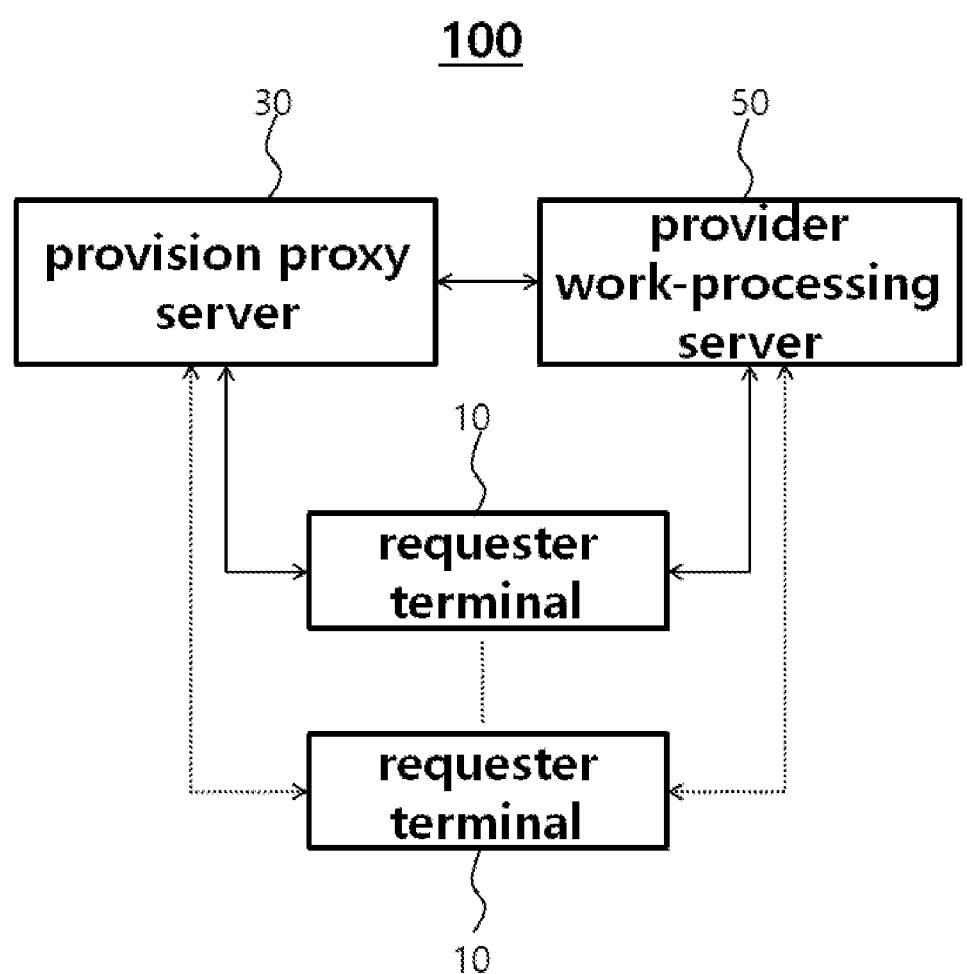
FIG. 1 is a block diagram of a work process supporting system based on interactive voice and text communication according to an embodiment of the disclosure.

FIG. 1 is a block diagram of a work process supporting system based on interactive voice and text communication according to an embodiment of the disclosure.

As shown in FIG. 1, a work process supporting system 100 based on the interactive voice and text communication according to an embodiment of the disclosure includes a requester terminal 10 used for various work processes by an information or service requester, a provision proxy server 30 providing information or service to the requester terminal 10 by proxy through a plurality of communication channels, and a provider work-processing server 50 identifying the information or service requester and requesting the provision proxy server 30 to do a work process by proxy.

The work according to the disclosure includes various kinds of work that common people have to do in daily life and want to get information or service related to. For example, the work includes various kinds of work such as consultation work, financial work, knowledge offering work, online shopping work, and the like work to which information or service common people want to get is related.

The information or service refers to content or behavior related to the work, which is needed to be provided to common people so that the work can be processed. According to the disclosure, the information or service may be provided through a voice or a text, may further be provided through a chat window activated through network connection, or may further be provided being exposed to the requester terminal 10 as a browser or an application is activated.

The requester terminal 10 is used by the information or service requester, who want to get consultation or a guide service, to ask for various pieces of information or service, and receives the requested information or service. Various pieces of information or service is displayed as a voice or text, an activated chat window or browser, or an application is activated.

The requester terminal 10 may make a request for information or service through a voice or text, and receive the requested information or service. To this end, the requester terminal 10 is configured to perform data communication with the provision proxy server 30 in parallel through the voice and text, and the information or service requester asks for and receives the information or the service through the requester terminal 10, in which at least one of the voice and the text may be selectively used to ask for and receive the information or service for a work process.

Thus, the requester terminal 10 makes a request for information or service and receives the requested information or service as the information or service requester selectively uses at least one of the voice and the text.

The requester terminal 10 is connected by a network to the provision proxy server 30, which provides the information or service for the work process on behalf of the provider work-processing server 50 administered by an information or service provider corresponding to a financial company, a credit card company, etc., and performs data communication in real time through at least one interactively activated and connected communication channel of a voice communication channel and a text communication channel.

The information or service requester may have congenital visual or hearing impairment or may have acquired visual or hearing impairment. Therefore, there is a need of allowing the information or service requester to select the voice communication channel or the text communication channel according to his/her congenital/acquired conditions. Meanwhile, the information or service requester may have difficulty in voice communication as surrounding noise becomes louder while the information or the service is provided through the voice communication channel, or may have difficulty in text communication as surroundings become darker while the information or the service is provided through the voice communication channel.

To solve such problems or take such conditions into account, a work process for providing information or service according to the disclosure is carried out by selectively using at least one of the voice and the text based on congenital/acquired conditions of an information or service requester.

Like this, on behalf of the information or service provider, the provision proxy server 30 performs an operation of providing the information or service about the work process to the information or service requester, whose identification has been completed. The provision proxy server 30 acts for a credit card company or the like information or service provider, which originally provides relevant information to the information or service requester, to thereby provide the information or service for the work process to the requester terminal 10.

The provision proxy server 30 receives a message that the information or service requester, i.e. the requester terminal 10 has been completely authenticated and identified from the provider work-processing server 50 administered by the information or service provider, establishes network connection with the identified requester terminal 10, does connection by activating the voice communication channel and the text communication channel, and performs data communication for the work process through at least one of the activated voice and text communication channels being connected.

The provision proxy server 30 transmits the content of the work process, which is requested by the information or service requester using the requester terminal 10, to the requester terminal 10 through the activated communication channel. Here, the content of all the information or service related to all the kinds of work treated and handled by the information or service provider is not sequentially provided, but only the content about the work process actually desired by the information or service requester is extracted and provided based on a real-time analysis result of a voice or text transmitted from the information or service requester or only the content about the work process needed to be provided to the information or service requester when the situations and conditions of the information or service requester are taken into account is extracted and provided. In this regard, detailed descriptions will be made later.

The provision proxy server 30 provides the information or service for the work process to the information or service requester on behalf of a financial company, a credit card company and the like information or service provider. Therefore, when the information or service requester makes a request for consultation or service through the requester terminal 10, the information or service provider requests the provision proxy server 30 to provide by proxy the information or service for the information or service requester after the authentication and identification.

To this end, the information or service provider administers the provider work-processing server 50. The provider work-processing server 50 corresponds to an institution operation and management system administered for customer consultation or management by a financial company, a credit card company or the like, as an institution work process system in which the information or service provider performs consultation or the like work process. Therefore, when the information or service requester using the requester terminal 10 requests the information or service for the work process through a telephone or another connection means, the provider work-processing server 50 automatically applies the authentication and identification process to the information or service requester, and then requests the provision proxy server 30 to provide by proxy the information or the service so that the information or the service can be automatically provided to the information or service requester whose identification has been completed.

Like this, the provider work-processing server 50 identifies the information or service requester who makes a request for the information or the service, and performs an operation of requesting the provision proxy server 30 to provide the information or the service by proxy. Then, the provision proxy server 30 provide content of a work process about the information or service requester's inquiry, requested work or service on behalf of the provider work-processing server 50, in other words, the information or service provider.

The provider work-processing server 50 identifies the information or service requester, and then transmits the identification information of the information or service requester to the provision proxy server 30. The identification information includes information about a phone number, information about an open service interface (or open application program interface (API), etc. as well as a basic private information. Meanwhile, the provider work-processing server 50 may transmit situation information of the information or service requester together with the identification information of the information or service requester when the identification of the information or service requester has been completed.

When the information or service requester has been completely identified, the provider work-processing server 50 checks whether there is work to be processed by the information or service requester or there is situation information about work to be provided to the information or service requester, and transmits the situation information together with the identification information to the provision proxy server 30 when it is checked that there is the situation information. Then, the provision proxy server 30 provides the content of the work process, in which the situation information is reflected, to the information or service requester, in other words, the requester terminal 10. In this regard, detailed descriptions will be made later.

MODE FOR INVENTION

Next, detailed configurations and operations of the work process support system 100 based on the interactive voice and text communication with the foregoing features according to the disclosure will be described.

Figure 2:
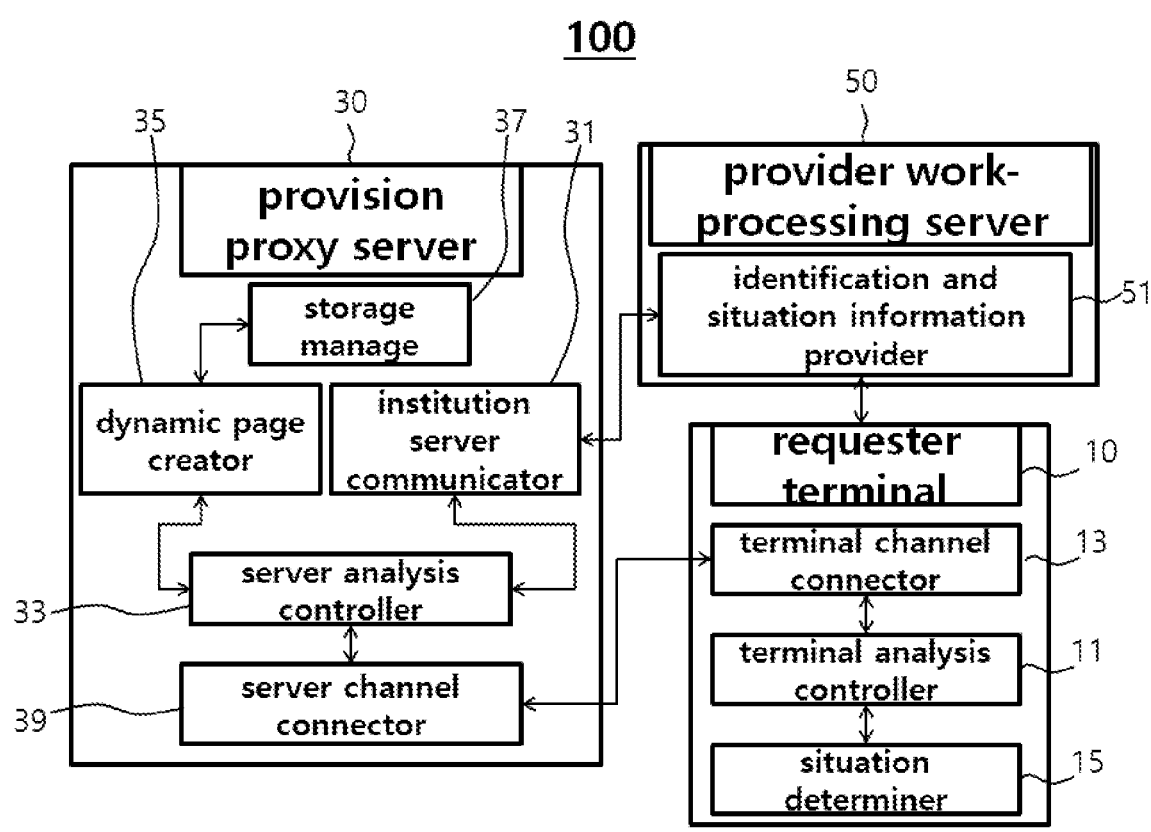
FIG. 2 is a detailed block diagram of a work process supporting system based on interactive voice and text communication according to an embodiment of the disclosure.

FIG. 2 is a detailed block diagram of the work process supporting system 100 based on interactive voice and text communication according to an embodiment of the disclosure.

The requester terminal 10 according to the disclosure performs operations of allowing an information or service requester to make a request for provision of information or service by selectively using at least one of the voice and the text, and receiving the requested information or service. To this end, the requester terminal 10, as shown in FIG. 2, includes a terminal analysis controller 11, a terminal channel connector 13, and a situation determiner 15.

The terminal analysis controller 11 establishes network connection and controls the terminal channel connector 13 to activate the voice communication channel and the text communication channel when receiving a request for establishing network or communication connection from the provision proxy server 30.

Specifically, the terminal analysis controller 11 establishes the network connection with the provision proxy server 30 by executing its own application or browser when link information is transmitted from the provision proxy server 30 and the information or service requester selects the link information, and performs interactive data communication with the provision proxy server 30 while controlling both the voice communication channel and the text communication channel to be activated through the terminal channel connector 13 so that the selection of the information or service requester or surrounding situations can be taken into account to carry out continuous and reliable data communication.

The terminal analysis controller 11 controls the data communication with the provision proxy server 30 to be performed through the voice communication channel or the text communication channel activated by the terminal channel connector 13 according to the selection of the information or service requester, thereby requesting the information or service for the work process and receiving the requested information or the service.

The terminal channel connector 13 activates not only the voice communication channel but also the text communication channel to perform data communication for the work process with the provision proxy server 30 under control of the terminal analysis controller 11. In result, the information or service requester may select and use one of the activated voice and text communication channels and the text communication channel.

The situation determiner 15 analyzes sensing information received from various sensors provided in the requester terminal 10 and transmits the information to the terminal analysis controller 11. Specifically, the situation determiner 15 transmits a message of excessive noise to the terminal analysis controller 11 when a noise sensing value received from a noise sensor (not shown) provided in the requester terminal 10 is higher than a preset noise upper-limit setting value. Further, the situation determiner 15 transmits a message of insufficient light to the terminal analysis controller 11 when a light sensing value received from a light sensor (not shown) provided in the requester terminal 10 is lower than a preset light lower-limit setting value.

The terminal analysis controller 11 controls the terminal channel connector 13 to make a communication channel connecting with the provision proxy server 30 automatically switch over to the text communication channel when receiving the message of excessive noise from the situation determiner 15 in the state that the information or service requester is using the voice communication channel between the activated voice and text communication channels. Further, the terminal analysis controller 11 controls the terminal channel connector 13 to make a communication channel connecting with the provision proxy server 30 automatically switch over to the voice communication channel when receiving the message of insufficient light from the situation determiner 15 in the state that the information or service requester is using the text communication channel between the activated voice and text communication channels.

The terminal channel connector 13 performs an operation of switching over to the communication channel requested by the provision proxy server 30 through switching request and approval processes for the communication channel with the provision proxy server 30 when receiving a switching control message for the communication channel connecting with the provision proxy server 30 from the terminal analysis controller 11.

With this configuration, the requester terminal 10 can receive the information or service for the work process through data communication with the provision proxy server 30, but the first contact or connection is achieved by the provider work-processing server 50 administered by a financial company, a credit card company or the like information or service provider. In other words, in order to receive the information or service for the work process, the information or service requester uses the requester terminal 10 for the first time to contact or connect with the provider work-processing server 50. In general, the requester terminal 10 uses telephone to primally connect with or contact the provider work-processing server 50, but may use another connection means (e.g. a chat window interface, etc.) as necessary for the contact or connection.

The provider work-processing server 50 identifies the information or service requester when the information or service requester tries contact or connection through the requester terminal 10, and requests the provision proxy server 30 to do by proxy the work process for the information or service requester. In other words, the provider work-processing server 50 identifies the information or service requester who requests the provision of the information or the service and requests the provision proxy server 30 to provide the information or the service by proxy.

To this end, the provider work-processing server 50 includes an identification and situation information provider 51 as shown in FIG. 2. The identification and situation information provider 51 identifies the information or service requester when the information or service requester makes a request for consultation, inquiry, various services, etc. through the requester terminal 10, and then automatically extracts identification information about the information or service requester, thereby transmitting the identification information to the provision proxy server 30, and requesting the provision proxy server 30 to do the work process by proxy.

Meanwhile, when the situation information about the information or service requester whose identification has been completed is needed while the identification and situation information provider 51 extracts and transmits the identification information about the information or service requester to the provision proxy server 30, the situation information about the information or service requester may also be transmitted to the provision proxy server 30.

Specifically, the identification and situation information provider 51 checks whether there is work to be preferentially processed by the identified information or service requester or whether there is work to be preferentially notified to the identified information or service requester, for example, whether there is an outstanding payment process, a late fee process, or the like work to be preprocessed, and then transmits situation information about presence of work to be preprocessed (e.g. presence of outstanding payment, etc.) together with the identification information to the provision proxy server 30.

The provision proxy server 30 receives a request for doing the work process by proxy together with the identification information (or information including the situation information as necessary) from the identification and situation information provider 51 of the provider work-processing server 50, uses the identification information and the situation information to establish network connection with the requester terminal 10, and activates a plurality of communication channels, thereby dong the work process of providing the information or service desired by the information or service requester. In other words, the provision proxy server 30 performs overall operations of providing the information or the service to the identified information or service requester on behalf of the information or service provider.

The provision proxy server 30 performs operations of analyzing in real time a voice or/and a text received from the requester terminal 10, dynamically forming only the content of the work process corresponding to the checked request, and transmitting the content to the requester terminal 10, and operations of dynamically forming only the content of the work process corresponding to the situation information about the information or service requester regardless of whether there is the request of the information or service requester, and transmitting the content to the requester terminal 10.

Specifically, the provision proxy server 30 performs operations of creating a dynamic page formed by extracting only the content of the work process related to the information or service requested by the information or service requester through the voice or the text, and transmitting the dynamic page to the requester terminal 10. In other words, the provision proxy server 30 does not fully guide or transmit overall content of the work process, for example, overall content of the work process related to consultation work of a financial company or consultation work of a credit card company to the requester terminal 10 of the information or service requester, but checks the actually requested information or service by analyzing the voice and (or) text received from the information or service requester, creates a dynamic page including only the content of the work process related to the requested information or service, and transmits the dynamic page to the requester terminal 10.

Further, the provision proxy server 30 creates the dynamic page formed with only the content of the work process extracted reflecting the situation information about the information or service requester whose identification has been completed by the provider work-processing server 50, and transmits the dynamic page to the requester terminal 10.

To carry out such operations, the provision proxy server 30, as shown in FIG. 2, includes an institution server communicator 31 to perform communication with various systems or servers administered or operated by the information or service provider, a server analysis controller 33 to perform overall control for the work process by analyzing input data, a dynamic page creator 35 to dynamically create only content needed for the work process to be transmitted to the requester terminal 10, a storage manager 37 to store and manage information about the information or service requester and overall content of the work to be processed by the information or service provider, and a server channel connector 39 to activate communication channels for data communication with the requester terminal 10.

The institution server communicator 31 performs an operation of transmitting/receiving data through communication with various systems or servers operated or administered by an information or service provider, in other words, a financial company, a credit card company, a contact center, an online shopping company, etc. Although FIG. 2 illustrates that the institution server communicator 31 performs the data communication as connected to the identification and situation information provider 51 of the provider work-processing server 50, the institution server communicator 31 may perform the data communication as connected to another system or server operated and administered by a financial company, a credit card company or the like institutions.

Therefore, the server analysis controller 33 can receive the identification information, the situation information, etc. of the information or service requester from the identification and situation information provider 51 of the provider work-processing server 50 through the institution server communicator 31, and further receive the corresponding pieces of information as connected to another system or server of the institution through the institution server communicator 31 as necessary when other pieces of information is needed for the work process.

The data or information received through the institution server communicator 31 is transmitted to and analyzed by the server analysis controller 33. The server analysis controller 33 checks and analyzes the identification information of the information or service requester received through the institution server communicator 31, and then controls the dynamic page creator 35 to create a dynamic page, which is formed with initial transmission content, to be transmitted to the requester terminal 10. The initial transmission content may include a simple guide message, a common guide message for a work process, or the like, may include an optional guide message for the work process, or may, as necessary, include a work process message reflecting the situation information of the information or service requester.

The dynamic page creator 35 creates a dynamic page formed with only the necessary content of the work process reflecting the pieces of information about the identified information or service requesters and all the content of the work process stored and managed in the storage manager 37 under control of the server analysis controller 33.

The server analysis controller 33 generates link information for establishing network connection between the requester terminal 10 and the provision proxy server 30 and transmits the link information to the requester terminal 10, in addition to the operation of controlling the dynamic page creator 35 to create the dynamic page formed with the initial transmission content. The server analysis controller 33 can transmit the link information to the requester terminal 10 because it can read the identification information (the identification information including a phone number or the like) of the information or service requester. The link information may be transmitted in the form of a push message as a conventional message transmission technique, or may be transmitted in the form of an interactive message as a conventional messaging service technique of Facebook, Kaka talk, etc.

The requester terminal 10 receives the link information and outputs the link information to be checked by the information or service requester. When the information or service requester clicks or selects the output link information, the requester terminal 10 is connected to the provision proxy server 30 by a network and receives the dynamic page.

Specifically, when the information or service requester clicks or selects the link information, a browser is automatically executed on the requester terminal 10 so as to output the dynamic page created and transmitted by the provision proxy server 30, or an automatic network connection application provided in the requester terminal 10 is automatically executed so as to output the dynamic page created and transmitted by the provision proxy server 30.

Like this, when the network connection between the requester terminal 10 and the provision proxy server 30 is established by the execution of the browser or application, the terminal analysis controller 11 of the requester terminal 10 controls the terminal channel connector 13 to activate the voice communication channel and the text communication channel as described above.

As the voice communication channel and the text communication channel are activated by the terminal channel connector 13, the server channel connector 39 of the provision proxy server 30 also activates the voice communication channel and the text communication channel so as to interactively communicate with the requester terminal 10 under control of the server analysis controller 33.

Specifically, the server analysis controller 33 transmits the link information to the requester terminal 10, and controls the server channel connector 39 to activate both the voice communication channel and the text communication channel for interactively communicating with the requester terminal 10.

In result, when the network connection is established between the provision proxy server 30 and the requester terminal 10, both the voice communication channel and the text communication channel are activated to perform continuous and reliable data communication, so that the provision proxy server 30 and the requester terminal 10 can interactively perform data communication for a work process through at least one communication channel of the voice communication channel and the text communication channel.

Thus, in the state that the network connection is established between the provision proxy server 30 and the requester terminal 10 and the interactive data communication for the work process is possible through at least one communication channel of the voice communication channel and the text communication channel, the server analysis controller 33 of the provision proxy server 30 analyzes in real time a voice or a text transmitted through the terminal channel connector 13 of the requester terminal 10 (i.e. the voice or text transmitted by the information or service requester) through the server channel connector 39, and determines the information or service requested by the information or service requester. For example, the server analysis controller 33 analyzes in real time the voice or text received from the information or service requester, and checks and determines that the information or service requester requests the provision of the information or service related to a report of a lost credit-card, issuance of a new credit-card, etc. among overall content of the work process of the credit card company.

Like this, the server analysis controller 33 of the provision proxy server 30 determines what information or service is requested by the information or service requester through the voice or text, and then controls the dynamic page creator 35 so that only the content of the work process directly related to the determined information or service can be extracted from the storage manager 37 and constitute the dynamic page.

Specifically, the server analysis controller 33 transmits the determined information or the service, in other words, the information or the service requested by the information or service requester, to the dynamic page creator 35. Then, the dynamic page creator 35 extracts and dynamically forms only the content of the work process directly related to the information or service requested by the information or service requester (for example, content about the report of the lost credit-card) from the storage manager 37, thereby creating a dynamic page. Then, the server analysis controller 33 transmits the created dynamic page to the requester terminal 10 through the network connecting with the requester terminal 10. The dynamic page may be displayed on a browser of the requester terminal 10 or displayed on a chat window or interactive message window automatically executed by the network connection.

Thus, the provision proxy server 30 performs operations of creating the dynamic page formed with only the extracted content of the work process related to the information or service requested by the information or service requester through the voice or text, and transmitting the dynamic page to the requester terminal 10. The server analysis controller 33 recognizes and analyzes the voice or(and) text transmitted in real time, determines the pieces of information or service continuously requested by the information or service requester, creates the dynamic page formed with only the content of the work process related to the determined information or service, and continuously transmits the updated dynamic page to the requester terminal 10. Then, the information or service requester can receive the dynamic page continuously updated reflecting only the information or service related to only his/her desired work process.

Meanwhile, the server analysis controller 33 may automatically create and provide the dynamic page to be provided to the information or service requester by taking the situation information about the information or service requester into account regardless of whether the information or service requester makes a request or not. Even in this case, the server analysis controller 33 of the provision proxy server 30 controls the dynamic page creator 35 to create the dynamic page dynamically formed by extracting only the content of the work process, which directly reflects the situation information about the information or service requester, from the storage manager 37.

Like this, the provision proxy server 30 performs operations of first creating the dynamic page formed by extracting only the content of the work process, which reflects the situation information about the information or service requester whose identification has been completed by the provider work-processing server 50, and transmitting the dynamic page to the requester terminal 10.

Specifically, the server analysis controller 33 of the provision proxy server 30 may additionally receive the situation information about the information or service requester as well as the identification information about the information or service requester from the identification and situation information provider 51 of the provider work-processing server 50 through the institution server communicator 31.

In this case, the server analysis controller 33 transmits the situation information (e.g. information about presence of outstanding payment, a late fee, etc.) about the information or service requester to the dynamic page creator 35. Then, the dynamic page creator 35 creates the dynamic page formed by extracting only the content of the work process, which can reflect the situation information about the information or service requester, from the storage manager 37. Then, the server analysis controller 33 transmits the dynamic page, which is created by reflecting the situation information, to the requester terminal 10 through the network connecting with the requester terminal 10. The dynamic page may be displayed on the browser of the requester terminal 10 or displayed on the chat window or interactive message window automatically executed by the network connection.

Thus, the provision proxy server 30 performs operations of creating the dynamic page formed by extracting only the content of the work process, which reflects the situation information about the information or service requester whose identification has been completed by the provider work-processing server 50, and transmitting the dynamic page to the requester terminal 10. The server analysis controller 33 recognizes and analyzes the voice or(and) text transmitted in real time, analyzes whether there is situation information needed to be provided regardless of the pieces of information or service continuously requested by the information or service requester, creates the dynamic page formed with only the content of the work process directly related to the situation information about the information or service requester when there is the situation information needed to be reported or provided to the information or service requester, and continuously transmits the updated dynamic page to the requester terminal 10. Then, the information or service requester can receive the dynamic page continuously updated reflecting only the information or service directly related to the situation information needed to be preferentially processed or recognized regardless of his/her request.

Meanwhile, the server analysis controller 33 of the provision proxy server 30 determines whether data communication with the requester terminal 10 is smooth through the server channel connector 39. Specifically, when it is determined that the communication channel (the voice communication channel or the text communication channel) currently used for connection between the server channel connector 39 and the terminal channel connector 13 of the requester terminal 10 is abnormal or that there is an error in recognizing and analyzing data (a voice or a text) transmitted through the currently used communication channel, the server analysis controller 33 controls the currently used communication channel to be switched over to another communication channel (e.g. switching over from the voice communication channel to the text communication channel or switching over from the text communication channel to the voice communication channel).

While the provision proxy server 30 and the requester terminal 10 are using a specific communication channel (e.g. the voice or text communication channel) to perform data communication, the current communication channel, i.e. the specific communication channel may be abnormal, or it may further be impossible to transmit the voice or text according to situations (e.g. unexpected situations or the like where there is difficulty in inputting a voice or a text), conditions (e.g. driving conditions or the like where there is difficulty in using the text communication channel), and surrounding environments (e.g. surrounding environments or the like where noise is loud) of the information or service requester using the requester terminal 10, or the voice or text may not be recognizable or analyzable because of a lot of noise even though it is possible to transmit the voice or text.

To solve such problems, the server analysis controller 33 controls the currently used communication channel to be switched over to another communication channel (e.g. switching over from the voice communication channel to the text communication channel or switching over from the text communication channel to the voice communication channel) when it is determined as described above that the currently used communication channel (e.g. the voice communication channel or the text communication channel) may be abnormal or that there is an error in recognizing and analyzing data (a voice or a text) transmitted through the currently used communication channel.

Meanwhile, the channel switching control operation of the foregoing terminal analysis controller 11 is also applied to the disclosure separately from the channel switching control operation of the server analysis controller 33 as described above. As described above, the terminal analysis controller 11 controls the channel switching operation based on sensing information received from the situation determiner 15 as described above. In this regard, the descriptions about the operations will be omitted because detailed descriptions thereof have already been made above.

Although a few exemplary embodiments of the disclosure have been described as above with reference to the accompanying drawings, it will be appreciated by those skilled in the art that modifications or changes may be variously made in these embodiments without departing from the spirit and scope of the disclosure defined in the following appended claims.

INDUSTRIAL APPLICABILITY

A work process support system based on interactive voice and text communication according to the disclosure has industrial applicability, as at least one of a voice and a text is selectively applied according to congenital/acquired conditions of an information or service requester, so that a work process for providing information or service can be carried out, thereby freeing from constraints in input/output means for performing the work process for providing the information or the service and carrying out the work process while keeping continuity, reliability and accuracy.

The invention claimed is:

1. A work process supporting system based on interactive voice and text communication, comprising:
   a requester terminal configured to allow an information or service requester to selectively use at least one of a voice and a text to request provision of information or service and receive the requested information or service;
   a provision proxy server configured to provide information or service to the information or service requester, whose identification has been completed, on behalf of an information or service provider, the provision proxy server comprising an institution server communicator, a server analysis controller, and a dynamic page creator; and
   a provider work-processing server configured to identify the information or service requester, who requests the provision of the information or service, and request the provision proxy server to do the provision of the information or service by proxy, the provider work-processing server comprising an identification and situation information provider configured to transmit a situation information along with the identified information or service requester to the provisional proxy server through the institution server communicator,
   wherein the situation information is defined as a work to be preferentially processed by the identified information or service requester or a work to be preferentially notified to the identified information or service requester,
   wherein the server analysis controller is configured to
      receive the identified information or service requester and the situation information from the identification and situation information provider through the institution server communicator, and
      determine what information or service is requested by the information or service requester and transmit the determined information or the service to the dynamic page creator,
   wherein the dynamic page creator is configured to create a dynamic page formed with only content of a work process, which is extracted reflecting the situation information about the information or service requester whose identification has been completed by the provider work-processing server, and transmit the dynamic page to the requester terminal.

2. The work process supporting system based on interactive voice and text communication according to claim 1, wherein the provision proxy server creates the dynamic page formed with only content of the work process, which is extracted in relation to information or service requested by the information or service requester using the voice or the text, and transmits the dynamic page to the requester terminal.

* * * * *